United States Patent [19]
de Judicibus et al.

[11] Patent Number: 5,874,962
[45] Date of Patent: Feb. 23, 1999

[54] SYSTEM AND METHOD FOR ARRANGING WINDOWS DISPLAYED BY A GRAPHICAL USER INTERFACE

[75] Inventors: Dario de Judicibus; Gherardo Albano, both of Rome, Italy

[73] Assignee: International Business Machines, Armonk, N.Y.

[21] Appl. No.: 804,726

[22] Filed: Feb. 21, 1997

[30] Foreign Application Priority Data

Mar. 8, 1996 [GB] United Kingdom .................. 9605001

[51] Int. Cl.$^6$ ................................ G06F 9/00; G06F 3/14
[52] U.S. Cl. ............................................. 345/342; 345/340
[58] Field of Search .................................. 345/332, 333, 345/339, 340, 342, 343

[56] References Cited

U.S. PATENT DOCUMENTS 5,371,847 12/1994 Hargrove ................................. 345/342
5,475,810 12/1995 Sasaki et al. ........................... 345/352
5,557,728 9/1996 Garrett et al. .......................... 345/340
5,577,187 11/1996 Mariani .................................. 345/342
5,596,699 1/1997 Driskell .................................. 345/352

*Primary Examiner*—Raymond J. Bayerl
*Assistant Examiner*—Cao H. Nguyen
*Attorney, Agent, or Firm*—Daniel E. McConnell; George E. Grosser

[57] ABSTRACT

In a graphical user interface, a method for automatically arranging the position of the windows on the desktop according to a weighting value in order to provide an intuitive disposition of the windows on the desktop. The windows are spread radially around the center of the display with the higher weighted windows closer to the center. The weight of a window for placement purposes is determined by a measure of importance for the window, such as area or the frequency with which the user operates on the window.

7 Claims, 7 Drawing Sheets

SYSTEM AND METHOD FOR ARRANGING WINDOWS DISPLAYED BY A GRAPHICAL USER INTERFACE

TECHNICAL FIELD

The present invention relates to a graphical user interface and particularly to a system and method for arranging the windows on a graphical user interface.

BACKGROUND OF THE INVENTION

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

It is usually possible to simultaneously execute several software applications. The execution of multiple applications simultaneously is often referred to as "multitasking". It is desirable in such environments to allow the user to view some or all of the applications simultaneously. This is often accomplished by the utilization of the concept of "windows" wherein all or part of multiple applications are displayed in separate viewports of a computer system video display system. It is known to have multiple software applications present on a computer display simultaneously, one or more of which may be active at any given time, and which may be displayed in a window or icon.

There may be several windows simultaneously present on the desktop with each window displaying information that is generated by a different application program. Each application program presents information to the user through its window by drawing images, graphics or text within the window region. The user, in turn, communicates with the application by pointing at graphical objects in the window with a pointer that is controlled by a pointing device, such as a mouse, and then selecting the objects, or by typing information via a keyboard associated with the monitor. Selection of the objects may be effected by actuating the mouse to move the pointer onto or near the objects and pressing and quickly releasing, i.e. clicking, a button on the mouse, or by manipulating a cursor via the keyboard.

These user interface objects may be easily manipulated utilizing a standard set of interface commands. For example, the user may move the windows around on the display screen, change their sizes and appearances, shrink down a window to a so-called icon, rearrange the objects with respect to their relative background/foreground position so as to arrange the desktop in a convenient manner, etc.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

A problem in a graphical user interface is that when several applications are opened simultaneously, the desktop may assume a cluttered appearance. Some of the windows can overlay other windows, or other graphical elements, such as icons, which are displayed on the desktop. Therefore the user needs to move the foreground windows to operate on hidden elements. Furthermore, if more than one window should be used at the same time, it is necessary to arrange those windows to allow simultaneous interaction.

It is known in graphical user interfaces to provide automated techniques, which avoid the need to manually arrange each single window.

The two most popular techniques are called "tile" and "cascade". Both of them provide an automated arrangement of windows on the desktop, but present some drawbacks.

The tile technique, as shown in FIG. 1, modifies the size of each window and arranges all the windows side by side and top to bottom. It uses the whole desktop area, allowing the user to work with many windows at the same time, without overlaps, but completely hiding the desktop and all the other graphical elements. The windows usually have all the same size, which is dependent on the number of windows to be arranged. Therefore, if many windows are arranged using the tile technique, each window becomes quite small.

The cascade technique, as shown in FIG. 2, arranges the windows so that each window is offset on two sides from the window it overlaps. The windows appear to be stacked, one behind the other. This technique minimizes the desktop area where windows are displayed, but makes it difficult to work with two windows at the same time and results in substantial overlap of the windows.

SUMMARY OF THE INVENTION

It is an object of the present invention to provide a technique which overcomes the above drawbacks.

According to the invention we provide, in a graphical user interface for graphically displaying a plurality of windows $W_i$ on a display area, a method of arranging the position of the windows on the display area, comprising for each window $W_i$ the steps of:

assigning to the window $W_i$ an offset angle $\alpha_i$;

displaying the window $W_i$ on the display area, positioning the window $W_i$ on a direction line passing through a predetermined point C of the plane of the display area and forming with a predetermined reference line an angle $\alpha_i$.

Furthermore, according to the present invention we provide a data processing system having a graphical user interface for graphically displaying on a display area a plurality of windows $W_i$ comprising:

means for assigning to each window $W_i$ an offset angle $\alpha_i$;

means for positioning each window $W_i$ on the display area, so that a direction line passing through a predetermined point C on the plane of the display area and through the window $W_i$ forms with a predetermined reference line an angle $\alpha_i$.

BRIEF DESCRIPTION OF THE DRAWINGS

Various embodiments of the invention will now be described in detail by way of examples, with reference to accompanying figures, where.

DETAILED DESCRIPTION OF THE PREFERRED EMBODIMENT

Figure 1:
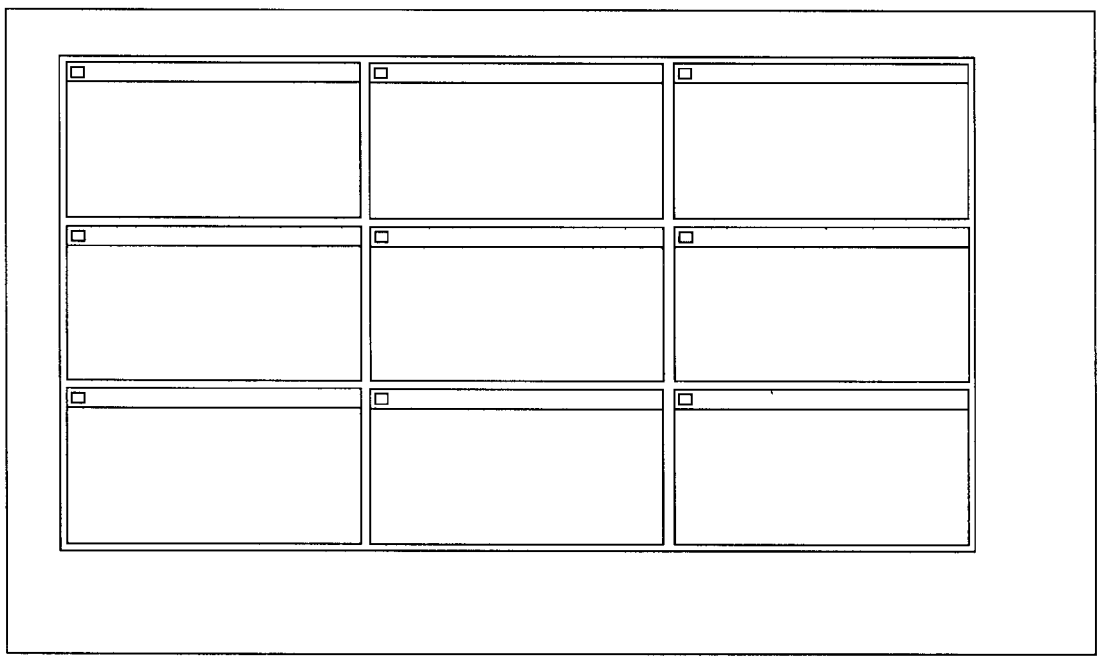
FIG. 1 shows schematically the prior art tile technique.
Figure 2:
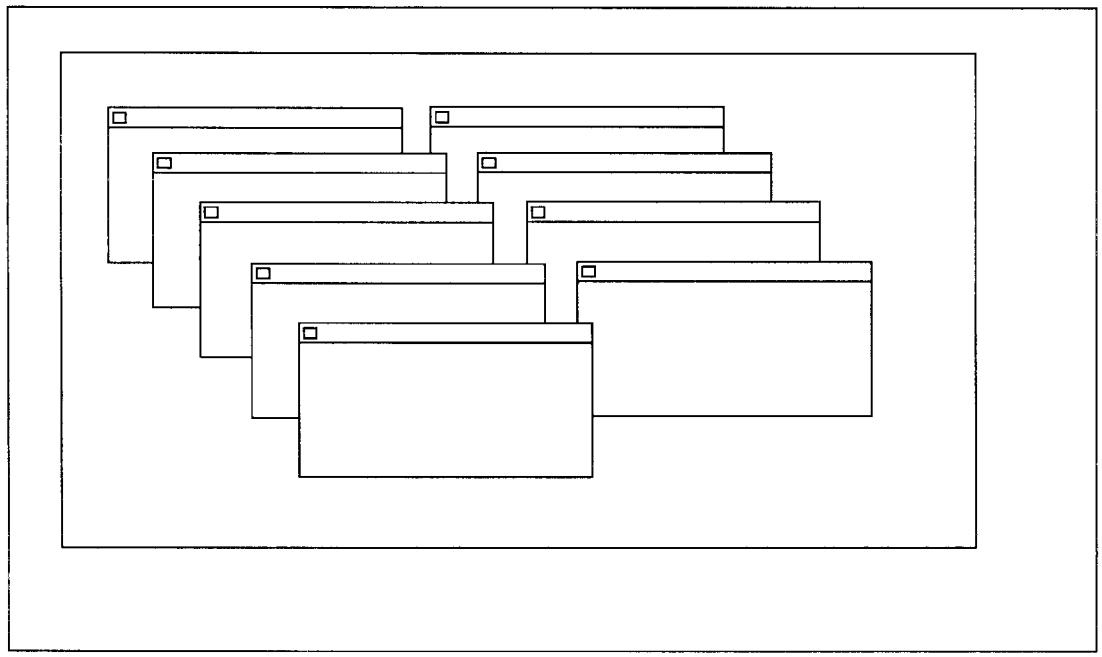
FIG. 2 shows schematically the prior art cascade technique.
Figure 3:
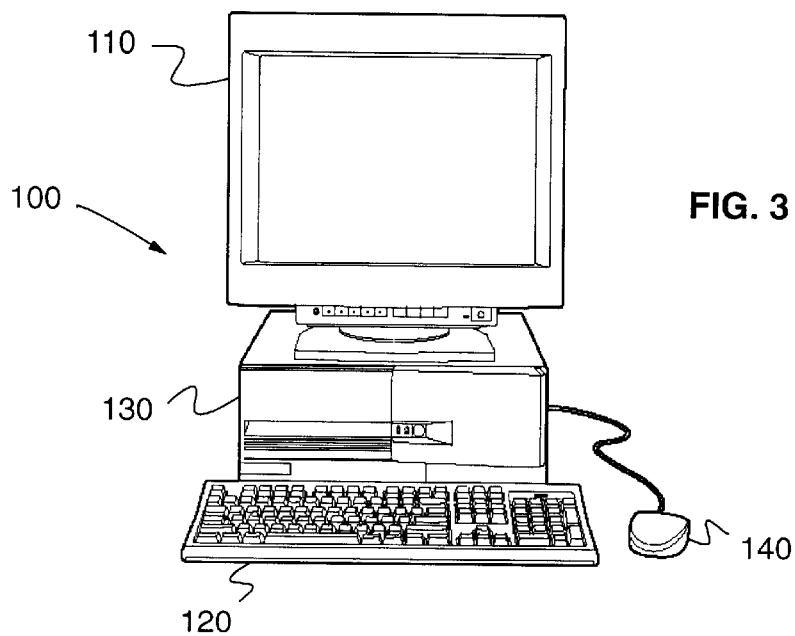
FIG. 3 shows schematically a computer which may be utilized to implement the method and system of the present invention.

With reference to FIG. 3, there is depicted a computer 100 which may be utilized to implement the method and system of the present invention. The computer 100 preferably includes a display unit 110 and a keyboard 120, coupled in a manner well known in the art. Additionally, the computer 100 includes a processor system unit 130 which may serve to mount a fixed disk drive and a diskette drive in addition to the main processor and memory. Further, in order to facilitate the utilization of a graphical user interface, computer 100 preferably includes a graphic pointing device, such as a mouse 140, which may be utilized to manipulate the position of a pointer (not shown) within a visual display on the screen 110. Those skilled in the art will appreciate that computer 100 may be implemented utilizing any state-of-the-art personal computer, such as the PS/2 Personal Computer manufactured by International Business Machines Corporation. (PS/2 is a trademark of International Business Machines Corporation).

Figure 4:
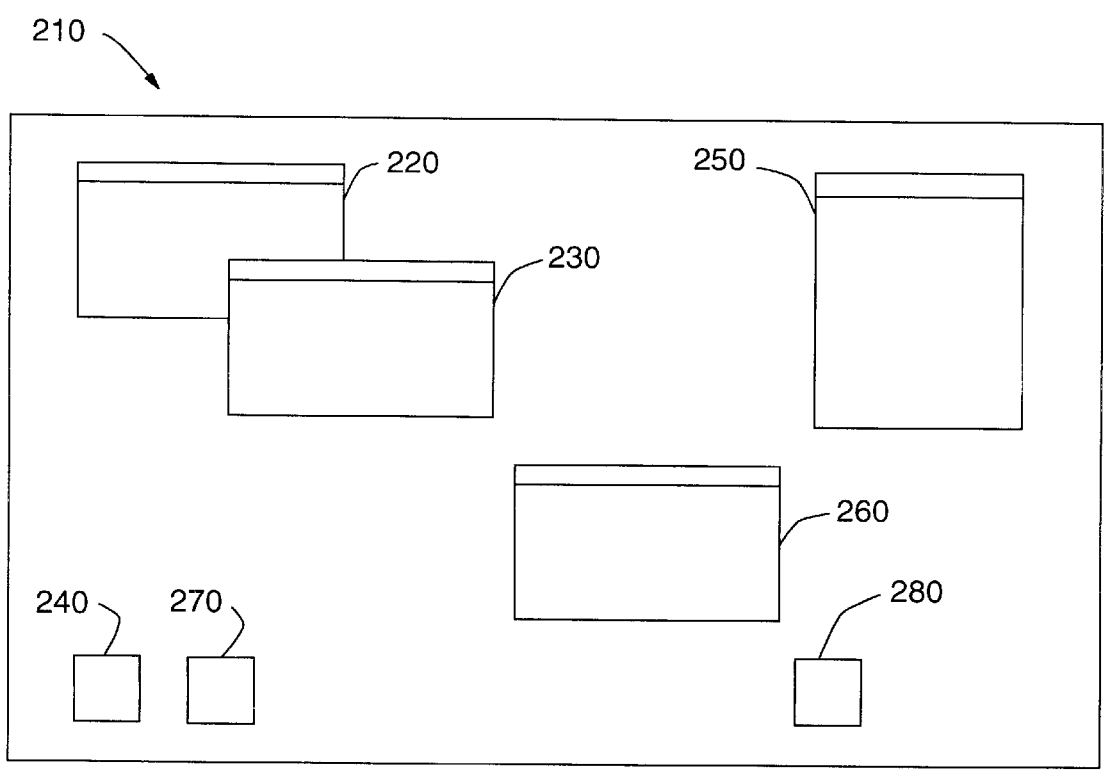
FIG. 4 shows schematically a graphical user interface used for the preferred embodiment of the present invention.

With regard now to FIG. 4, a graphical user interface which may be utilized to implement the method and system of the present invention is shown. The graphical display is typically arranged to resemble a single desktop 210. Execution of an application program involves one or more user interface objects represented by windows 220, 230 and icons 240. Typically, there may be several other windows 250, 260 and icons 270, 280 simultaneously present on the desktop and displaying information that is generated by different applications.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the window 220 for presentation to the user.

Figure 5:
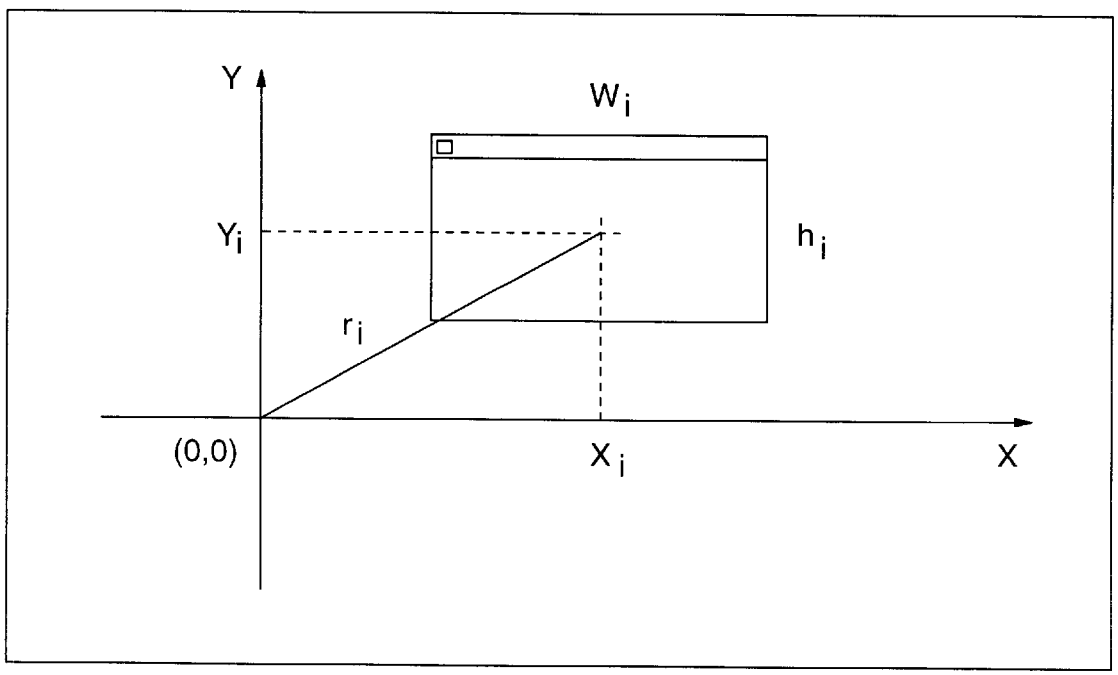
FIG. 5 shows schematically the Cartesian system used for identifing the windows.

Let's suppose now an infinite plane and a coordinate system as shown in FIG. 5. The plane represents a theoretical infinite display on which are represented some windows. Each window $W_i$ is identified by a triplet $[x_i, y_i, A_i]$, where $x_i$ and $y_i$ are respectively the horizontal and vertical position of the geometrical center of the window, while $A_i$ is the weighting given to the window; in the preferred embodiment the weight of a window is represented by its area so $A_i = w_i * h_i$, but other kinds of weighting would work equally well (e.g. the importance of the application associated with the window or the frequency with which the window is used).

Figure 6:
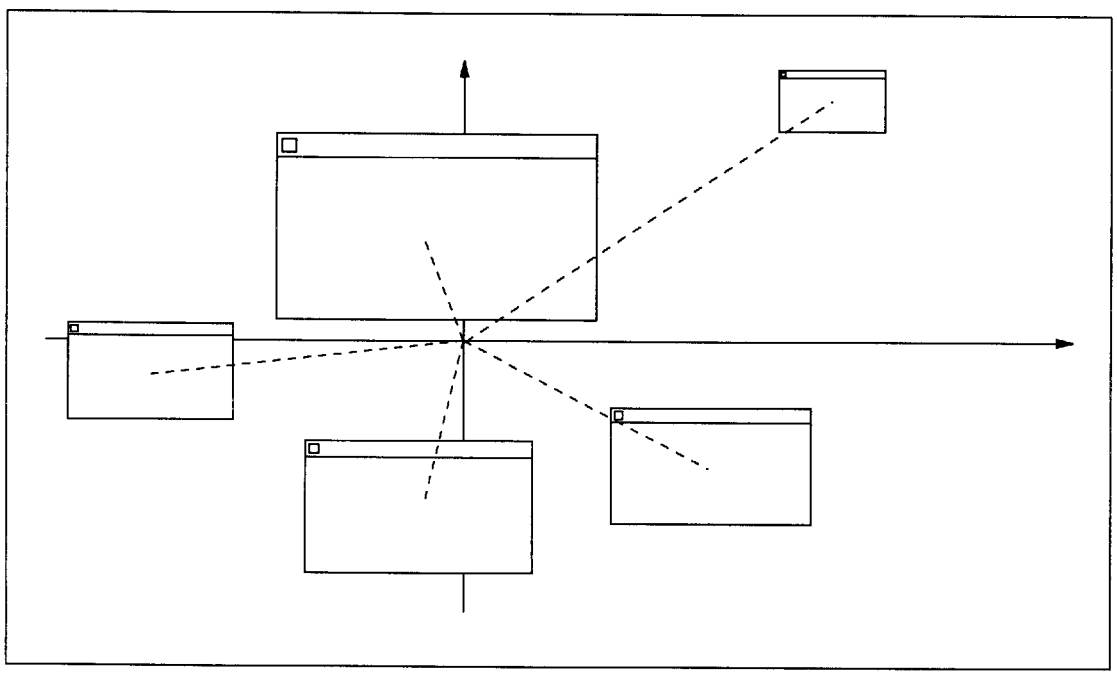
FIGS. 6, 7, 8, 9, 10, 11 and 12 show schematically the arrangement of the windows according to the preferred embodiment of the present invention.

With reference to FIG. 6 we define the set of windows to be "Weighted-arranged" (W-arranged) if it satisfies the following requirements:

the single windows $w_i$ are widely distributed, i.e. their geometrical centers are positioned on straight lines which start from the origin and whose angle $\alpha_i$ with respect to a reference line is a multiple of $2\pi/N$, where N is the number of windows in the set. In such case we say the system is spread.

the "center of gravity" of the whole set coincides with the origin of the Cartesian coordinate system. In such case we say the system is balanced. The center of gravity of the set is calculated by associating to each window $W_i$ a weight $A_i$ which, as mentioned above, can correspond to the window area. The center of gravity is defined by the formula:

$$\frac{\sum_{1}^{N} {}_i r_i \times A_i}{\sum_{1}^{N} {}_i A_i}$$

In the preferred embodiment the angle $\alpha_i$ is equal to $i*2\pi/N$ where $1<=i<=N$ and N is the number of the windows displayed on the desktop; in this way the angular separation between the lines on which the windows are positioned are equal and the angle between two adjacent lines is $2\pi/N$, but any other disposition could work equally well.

Figure 7:
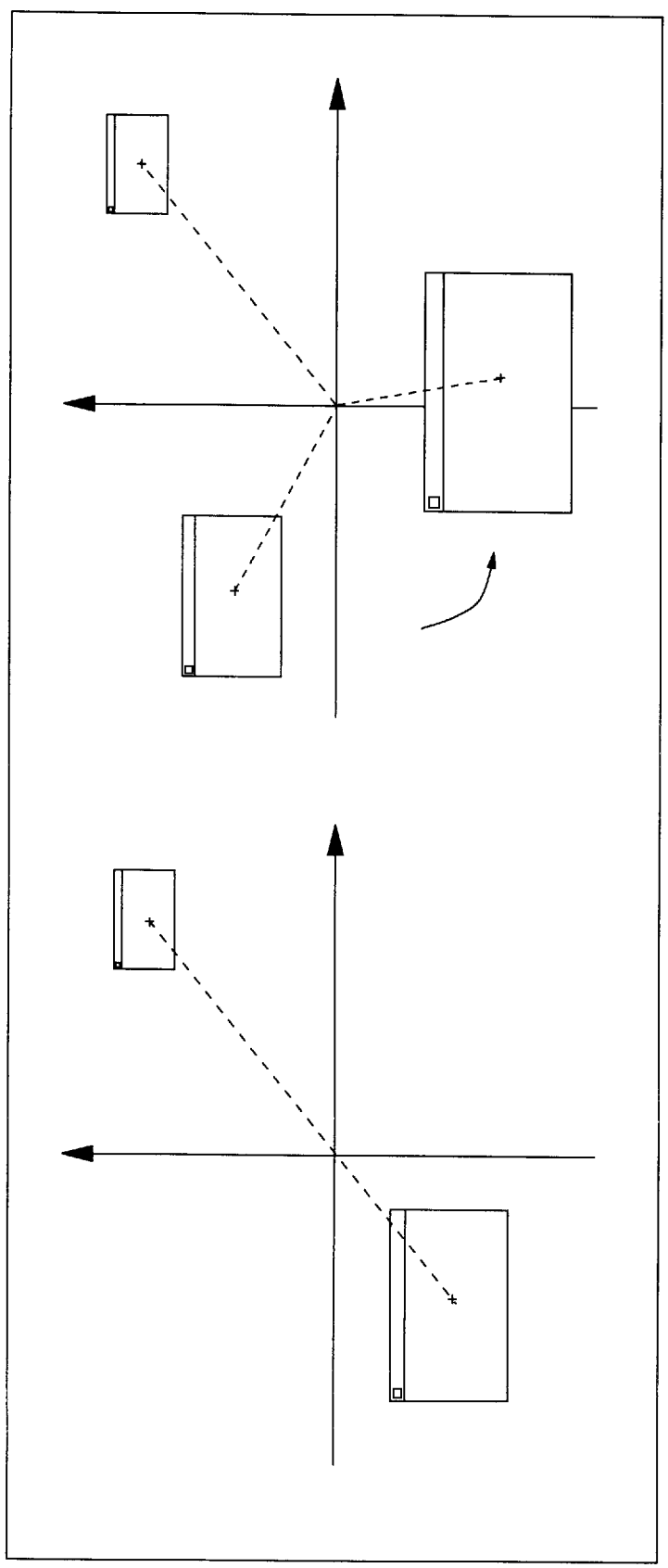

In the preferred embodiment the method used for W-arranging a set of windows is to progressively add one window at a time. The case of a set comprising only one window is of course of no interest. The first two windows will be positioned along the same line passing through the origin, which is to say the angle between the two direction lines is $2\pi/2$, as shown in FIG. 7. The relative position of the windows will be determined by the weight of each window. Using as a weight the area of the windows, the largest window will be closer to the center.

If we add now a third window, the angle between the direction lines will change from $2\pi/2$ to $2\pi/3$. We keep the lighter window in its position and rotate the other until the direction lines passing through the center of the two windows form an angle of $2\pi/3$. We add the third window to the set obtaining a spread set. To balance the set we change the position of the heaviest window and of the newly added one. Choosing to move the heaviest window of the set gives the advantage of requiring little movements for balancing the set.

Figure 8:
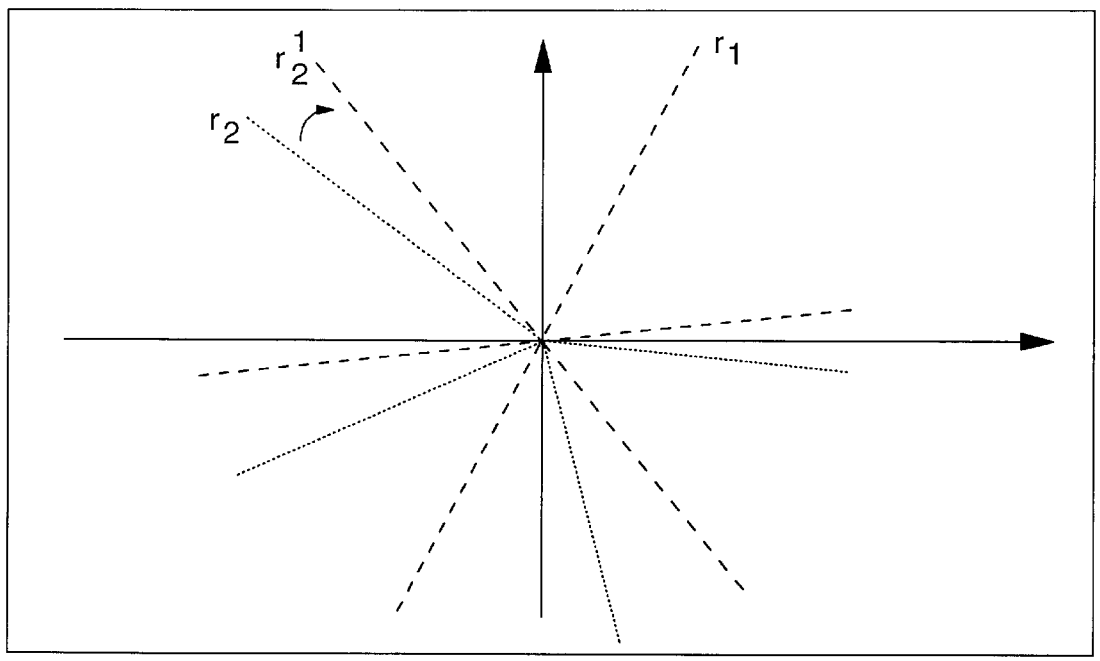

All the windows of the set are added one at a time. In the preferred embodiment the method is always to hold the "lightest" window in its position, and to move the others, and to use the heaviest window to re-balance the set (FIG. 8).

Figure 9:
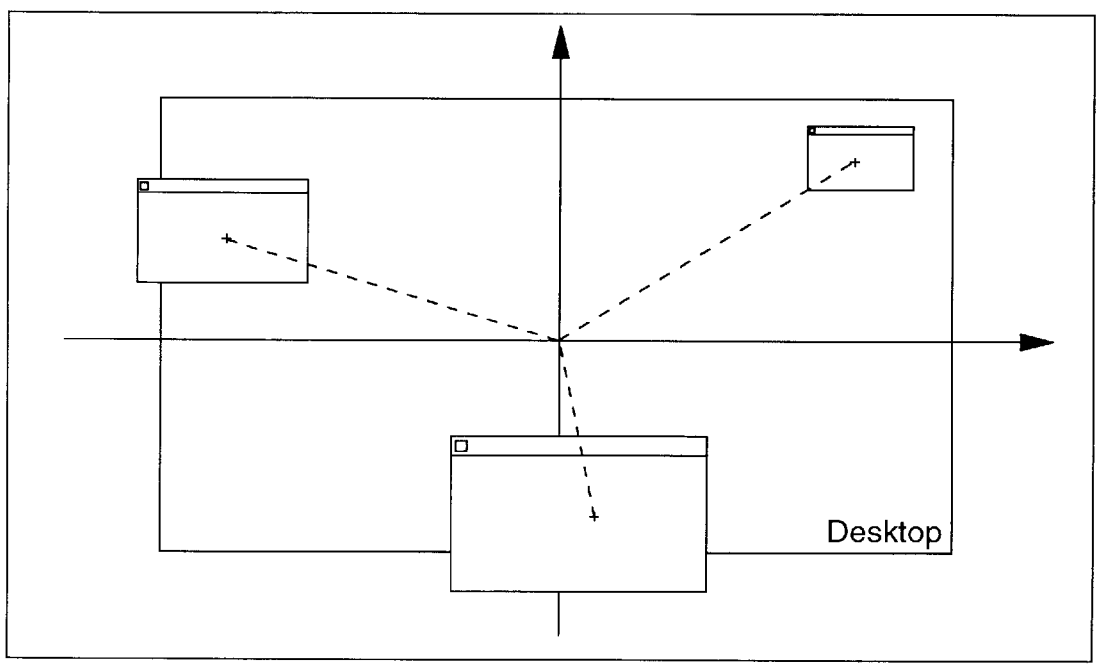
Figure 10:
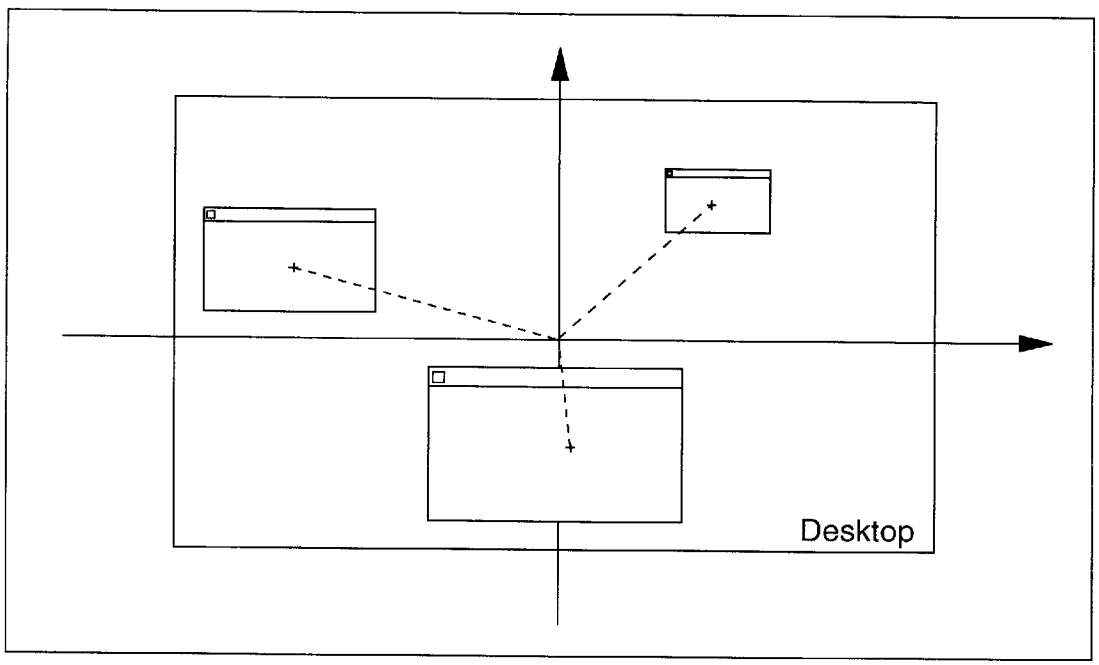
Figure 11:
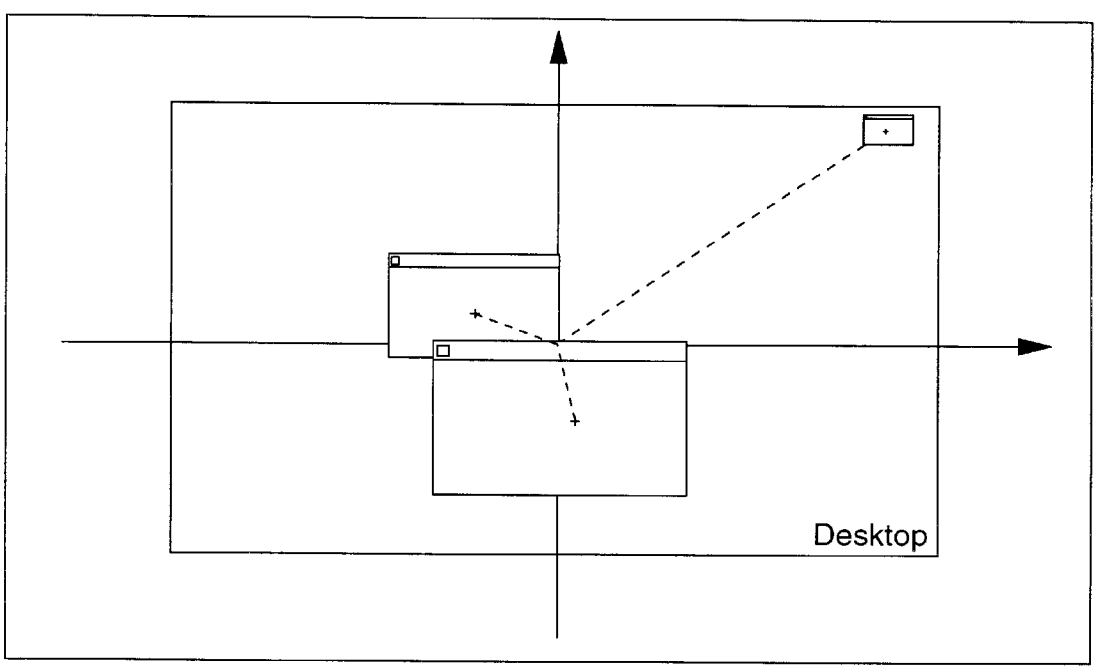

When displaying a W-arranged set on a desktop we need to consider the constraints caused by the limited dimension of the display unit, otherwise some window could be partially out of the screen (FIG. 9). In other words the set must be "normalized" (FIG. 10). A very simple method of normalization could be to scale the whole set down to the dimension of the desktop. However, such method could cause some drawbacks; if for example the set comprises a very lightly weighted window, that window will be far from the origin, at a much greater distance than the average of the other windows. To include such a window in the desktop, such normalization would reduce the scale too much, causing most of the windows to concentrate in the center overlapping each other (FIG. 11).

A possible measure to avoid this problem could be to fix a threshold to the variance from the average distance of each window from the origin. When such threshold is exceeded, the set should be adjusted. Again the best window to be moved is the one with the highest weight, because small movements will correspond to big changes in the set balancing.

Figure 12:
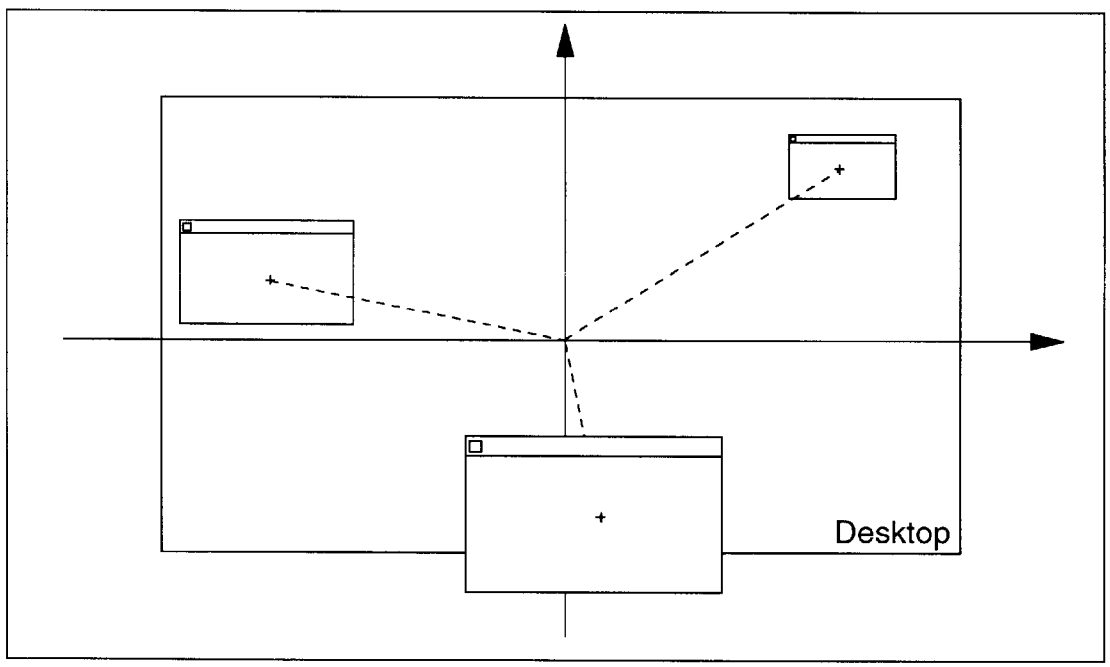

Those skilled in the art will appreciate that a number of different methods can be used to implement the normalization process and that additional parameters can be taken into account when implementing the whole arranging process. An example is that we can consider that the desktop is usually not a perfect square, but a rectangle, which has the ratio between the width and the height not equal to one. For this reason some correction should be applied to the vertical direction (which is usually the shortest one) to avoid a window being partially out of the desktop (FIG. 12).

It will be apparent from the above description that, by using the technique of the preferred embodiment of the present invention, a more intuitive disposition of the windows on the desktop is achieved, whilst also providing a good balance between the use of the desktop area for displaying the windows and the overlapping of the windows with each other and with the other graphic elements.

We claim:

1. In a graphical user interface for graphically displaying a plurality of windows W on a display area, a method of arranging the position of the windows on the display area, comprising for each window Wi the steps of:

assigning to the window Wi an offset angle ai;

displaying the window Wi on the display area;

positioning the window Wi on a direction line passing through a predetermined point C centered on the plane of the display area forming with a predetermined reference line the angle ai, wherein the angle ai=i2π/N and where 1<=I<=N and N is the number of the windows displayed on the display area;

assigning to the window Wi a weight Ai; and varying the position of the window Wi along the direction line according to the weight Ai.

2. The method of claim 1 wherein the weight $A_i$ is function of the area occupied by the window $W_i$ on the display area.

3. The method of claim 1 wherein the point C is the center of the display area.

4. A data processing system having a graphical user interface for graphically displaying on a display area a plurality of windows Wi comprising;

means for assigning to each window Wi an offset angle ai;

positioning means for positioning each window Wi on the display area, so that a direction line passing through a predetermined point C centered on the plane of the display area and through the window Wi forms with a predetermined reference line an angle ai, wherein the angle ai=iπ2/N where 1<=I<=N and N is the number of the windows displayed on the display area; and means for assigning to the window Wi a weight Ai; and for varying the position of the window Wi along the direction line according to the weight Ai.

5. The graphical user interface of claim 4 wherein the weight $A_i$ is function of the area occupied by the window $W_i$ on the display area.

6. The graphical user interface of claim 4 wherein the point C is the center of the display area.

7. The graphical user interface of claim 4 wherein the angle ai=I*2/N where 1<=I<=N and N is the number of the windows displayed on the display area.

* * * * *